United States Patent [19]

Bonczyk et al.

[11] 3,796,499
[45] Mar. 12, 1974

[54] METHOD AND APPARATUS FOR DETERMINING THE CONCENTRATION OF PARAMAGNETIC MATERIAL IN A GAS MIXTURE

[75] Inventors: Paul A. Bonczyk, Manchester; Casper J. Ultee, Glastonbury, both of Conn.

[73] Assignee: United Aircraft Corporation, East Hartford, Conn.

[22] Filed: Mar. 22, 1973

[21] Appl. No.: 343,751

[52] U.S. Cl. ............... 356/201, 324/.5 R, 356/85, 356/97
[51] Int. Cl. ..................... G01n 21/06, G01j 3/30
[58] Field of Search ............... 324/.5 R, .5 A, .5 F; 356/201, 85, 88, 96, 97

[56] References Cited
UNITED STATES PATENTS 3,071,721  1/1963  Dehmelt ........................ 324/.5 F
3,676,004  7/1972  Prugger et al. .................. 356/97 X
3,691,454  9/1972  Hrubesh et al. .................. 324/.5 A Primary Examiner—Stanley T. Krawczewicz
Attorney, Agent, or Firm—Anthony J. Criso

[57] ABSTRACT

A method and system for detecting the presence of a paramagnetic material in a gaseous mixture are disclosed. A sample of the mixture is subjected to modest strength magnetic fields and a source of stable frequency laser radiation. The magnetic field modifies an energy level spacing in the paramagnetic material due to the Zeeman effect to produce a resonant match with the laser radiation. Standard detection procedures are used to quantitatively correlate the variation in the intensity of the laser radiation passing through the mixture as a function of the magnetic field strength. In the case of nitric oxide, the method is sufficiently sensitive to detect concentrations considerably less than one part per million.

8 Claims, 2 Drawing Figures

METHOD AND APPARATUS FOR DETERMINING THE CONCENTRATION OF PARAMAGNETIC MATERIAL IN A GAS MIXTURE

BACKGROUND OF THE INVENTION

1. Field of the Invention

This invention relates to the detection of materials having paramagnetic properties and more particularly to a simple determination of the molecular concentration of a paramagnetic material in a gaseous mixture.

2. Description of the Prior Art

The ability to detect the presence of and determine the amount of certain gases in a gas mixture is of considerable interest because of the growing general concern over environmental pollution. The exhaust from internal combustion engines is a significant source of atmospheric pollution and nitric oxide is one of the objectional constituents of the exhaust gas mixture from internal combustion engines.

Several techniques for determining the presence and concentration of nitric oxide particularly in gaseous mixtures currently exist. In one such system the nitric oxide is oxidized to nitrogen dioxide and then exposed to wet chemical methods. Alternatively, the nitric oxide is changed to nitrous oxide and then subjected to standard infrared emission techniques. While these systems are functional, they involve the disadvantages of wet chemical techniques which include the requirements of a large volume of a sample and the many hour duration required to achieve an adequate sensitivity for concentrations of nitric oxide which are of interest in applications such as the detection of environmental pollution.

Recently, a significantly more sensitive nitric oxide detection system was disclosed by Patel in which a source of laser radiation is passed through a semiconductor crystal such as indium antimonide. The crystal is simultaneously subjected to a high strength magnetic field which is produced with superconducting magnet. The interaction between the laser energy, the semiconductor and the magnetic field shifts the frequency of the laser radiation, allowing the frequency to be tuned to the precise wavelength suitable for strong absorption by nitric oxide. The detection of nitric oxide concentrations as small as twenty parts per billion have been reported by Patel. This represents a considerable improvement over all of the detector systems previously available, however, the Patel technique is complex and expensive since highly special semiconductive material, superconducting magnets and liquid helium are required.

SUMMARY OF THE INVENTION

A primary object of the present invention is the detection of a paramagnetic gas. A specific object is the determination of the amount of nitric oxide present in a gaseous mixture.

According to the present invention, a source of laser radiation is directed through an enclosure containing a sample gaseous mixture which includes paramagnetic molecules and onto an optical detector; a direct current magnetic field and a modulating alternating current magnetic field are applied to the sample and due to the Zeeman effect, the absorption of the paramagnetic material is tuned to a resonance with the wavelength of the laser radiation; the detector responds to the variations in intensity of the transmitted laser radiation, and an electronic signal which correlates the transmitted intensity and the strength of the direct current magnetic field is compared with a similar signal for a calibrated sample to determine the concentration of the paramagnetic material in the sample.

The primary advantages of the present invention include the high sensitivity of detection, the simplicity of the physical system and the relatively inexpensiveness of the overall device.

One feature of the present invention is that coherent radiation at various wavelengths is used in the quantitative detection of various paramagnetic materials. This magnetic tuning of the materials is due to the Zeeman effect which causes a change in the energy level separation, and the characteristic wavelength at which resonant absorption occurs correspondingly is changed by ten thousandths of a micron. The power output of a typical radiation source required for the present invention is a few milliwatts. The resonant tuning of the paramagnetic such as nitric oxide is provided by a relatively strong direct current magnetic field which is swept through the nitric oxide; a weaker alternating current magnetic field is also applied to the nitric oxide to modulate the absorption. The sensitivity of the system is sufficient to pick up nitrogen oxide concentrations which are considerably less than one part per million.

The foregoing and other objects, features and advantages of the present invention will become more apparent in the light of the following detailed description of preferred embodiments thereof as illustrated in the accompanying drawing.

BRIEF DESCRIPTION OF PREFERRED EMBODIMENTS

Figure 1:
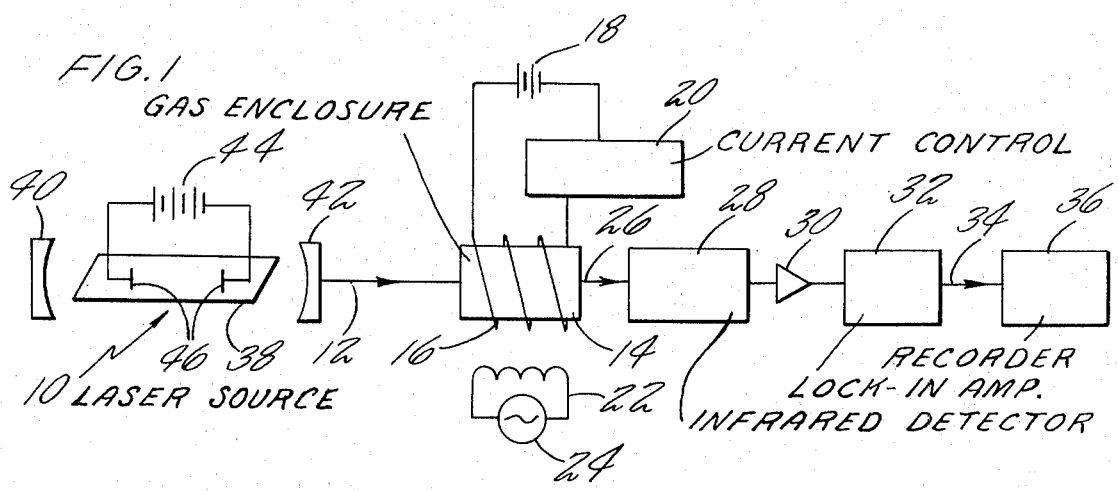
FIG. 1 is a simplified schematic diagram of nitric oxide detection system in accordance with the present invention.

A typical system used in accordance with the present invention is shown schematically in FIG. 1. A laser source 10 provides a source beam 12 of stable frequency radiation. The beam is directed into a nonmagnetic gas enclosure 14 which has windows that are transparent to the laser radiation and contains a sample of the gaseous mixture to be investigated. The enclosure is surrounded by a solenoid 16 which is energized by a source 18 of direct current; the solenoid provides a primary magnetic field throughout the entire region containing the sample and a current control unit 20 is located between the solenoid and the source of direct current. In addition, a secondary magnetic field coil 22 which is energized by a source 24 of alternating current provides a modulating electric field. An output beam 26 comprising the laser radiation transmitted through the enclosure is intercepted by an infrared detector 28. A preamplifier 30 and a lock-in amplifier 32 in combination provide an electronic signal 34 which is fed to a graphic recorder 36.

In the case of nitric oxide detection, the laser source 10 comprises an electrically excited carbon monoxide system having stable frequency operating characteristics. A glass tube 38 having Brewster angle windows of a material such as barium fluoride which is transparent to radiation at the wavelength of interest is located in the oscillation cavity formed between a grating 40 and a partially transmitting mirror 42. A source 44 of direct current electric power pumps the laser gas by maintaining an electric discharge between the electrodes 46.

In the operation of the apparatus shown in FIG. 1, the grating causes the laser to oscillate at precisely on the 5.307 micron line. The source beam 12 is directed into the enclosure 14 which has an absorption pathlength of 40 centimeters and contains a gas mixture comprising $5 \times 10^{-4}$ torr of nitric oxide and 100 torr of nitrogen.

Figure 2:
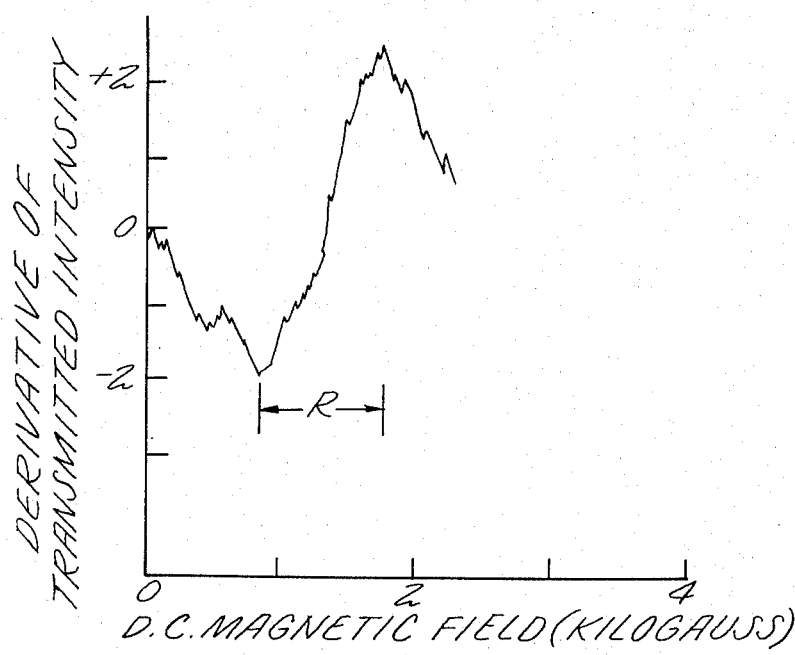
FIG. 2 is a plot of the derivative of the transmitted intensity of the laser radiation transmitted through the nitric oxide cell shown in FIG. 1 as a function of the magnetic field applied to the cell.

The enclosed gas sample comes under the influence of the primary magnetic field which is produced by the solenoid and has an axis colinear with the direction of propagation of the laser radiation through the enclosure. The magnetic field from the solenoid can range as high as several kilogauss although no more than about two kilogauss is suitable for most practical applications. The source 18 provides a stable voltage direct current for the solenoid. The current can range as high as 35 amperes and is stable to within a few percent, the stability requirement being the ratio of the width, R, of the resonance shown in FIG. 2, to the magnitude of the magnetic field at which the resonance occurs. The flow of current is varied at a prescribed rate as governed by the current control unit 20 causing the magnetic field to be swept in magnitude between zero and 2 kilogauss at a linearly varying rate which is typically 2,000 gauss per minute. The swept field changes the electronic energy level spacing of the nitric oxide and a resonant matching between the energy level separation in the nitric oxide and the wavelength of the incident laser radiation occurs during the sweep. In addition, the modulating magnetic field produces a secondary flux which is superimposed on the primary field to facilitate standard phase sensitive detection techniques for recording at optimum signal-to-noise ratios, the extent of laser absorption by the sample. The modulating field has a strength of two gauss and is alternated at 38 KHz. The resultant magnetic field therefore has both direct current and alternating current components, the former being linearly variable with time at a rate which is slow compared to the rate at which the alternating current component is modulated. This permits, with the use of a lock-in amplifier having a time constant of one tenth of a second, the recording of the derivative of absorption as a function of the strength of the primary magnetic field as is fully explained in C. H. Townes and A. C. Schawlow, Microwave Spectroscopy, McGraw-Hill, N.Y., 1955 pgs. 420–428. Also the optimization of the signal-to-noise factor is possible since the absorption is detected as an alternating current at 38 KHz as opposed to a direct current signal, thereby minimizing the noise detected with the signal.

The portion of the input laser radiation which is transmitted through the windows of the glass enclosure is intercepted by an infrared detector having a suitable material such as gold-doped germanium. The detector converts the optical radiation incident thereon into an electric signal having a current which varies at the modulation frequency of the secondary magnetic field. The electric signal is amplified and demodulated using standard signal processing techniques by the lock-in amplifier 30 which is tuned to the modulation frequency. The output signal from the lock-in amplifier is directed to a recorder that can be an x-y recorder which produces a graphic display of the intensity of the transmitted light of the function of the primary magnetic field. The change in this intensity with respect to the change in the strength of the primary magnetic field is plotted as a function of the strength of the primary field strength in FIG. 2.

A quantitative determination is made of the amount of nitric oxide present in the sample by comparing the electronic signal 34 with a similar signal obtained when a calibrated sample of nitric oxide is substituted in the gas enclosure 16.

The simplicity and relative inexpensiveness of the apparatus needed to practice the present invention are apparent from the limited amount of standard elements required as shown in FIG. 1. In addition, the high degree of sensitivity attainable with the technique disclosed herein is the result of the sharp resonant absorption of the stable frequency 5.307 micron radiation by the magnetically tuned nitric oxide; at the resonant condition a sharp attenuation of the radiation occurs in a gas mixture having even trace concentrations of nitric oxide. The sharp resonant attenuation is possible because the wavelength of the laser energy is so sharply defined.

At the essence of the present invention is the application of a suitable magnetic field to tune paramagnetic molecules into a resonant condition with a source of stable frequency radiation. In the case of one specific material, resonant-type absorption by nitric oxide is observed at 5.167 microns, 5.189 microns, 5.263 microns and 5.307 microns. Of all the lines mentioned, the 5.307 micron line has been found to be the most strongly absorbing for modest strength magnetic fields; however, the alternate lines are functionable in accordance with the present invention although with reduced effectiveness. The prime criterion for the successful practice of the present invention is tuning the paramagnetic material into a condition of resonance with a source of stable frequency radiation.

A stable laser source which provides radiation at 5.307 microns is used in the present disclosure. In particular, the laser radiation is produced with a carbon monoxide laser having a suitable line selective grating. The precise laser used in the invention is relatively unimportant provided that the wavelength of the radiation is suitable for creating a resonant condition with suitable magnetic tuning of the material being investigated.

The sensitivity of the system is determined by the absorption coefficient of the paramagnetic and the noise inherent in the detector and related electronics. The overall sensitivity of any given system can be increased by using a multiple pass gas enclosure in place of the previously described pass sample gas mixture enclosure. The multiple pass devices result in a higher signal-to-noise ratio than the nominally one percent attenuation of the laser energy observed in single pass system. The laser attenuation is directly proportional to the number of passes the radiation makes through the cell.

Although this invention has been shown and described with respect to preferred embodiments thereof, it should be understood by those skilled in the art that various changes and omissions in the form and detail thereof as indicated, may be made therein without departing from the spirit and scope of the invention.

Having thus described typical embodiments of our invention, that which we claim as new and desire to secure by letters patent of the United States is:

1. Apparatus for determining the concentration of a paramagnetic material in a gaseous mixture comprising:
   means providing a beam of stable frequency laser radiation along an optical path;
   enclosure means for containing the gaseous mixture which is positioned in the optical path;
   means providing a primary magnetic field within the enclosure means with a source of direct electric current, the primary magnetic field being disposed about a central axis which penetrates the enclosure means and is colinear with the optical path;
   means for sweeping the intensity of the primary magnetic field in the enclosure means;
   means providing a secondary magnetic field within the enclosure means with a source of alternating electric current; and
   means for sensing the intensity variation of the laser radiation which is transmitted through the enclosure means.

2. Apparatus according to claim 1 including recording means for graphically describing the intensity of the transmitted laser radiation as a function of the intensity of the primary magnetic field maintained within the enclosure means.

3. Apparatus according to claim 1 wherein the means providing a beam of stable frequency laser radiation comprises an electric discharge excited carbon monoxide laser.

4. Apparatus according to claim 1 wherein the enclosure means for containing the gaseous mixture comprises a nonmagnetic container having windows which are transparent to the laser radiation.

5. Apparatus according to claim 1 wherein the means for sweeping the primary magnetic field comprises a constant voltage power supply having a regulated stable current output which is programmed to provide a linearly changing magnetic field.

6. Apparatus according to claim 1 wherein the means for determining the intensity of the laser radiation which is transmitted through the enclosure means comprises an infrared detector, a frequency selective preamplifier and a lock-in amplifier.

7. Apparatus according to claim 2 wherein the recording means comprises an $x$-$y$ recorder.

8. The method of determining the concentration of nitric oxide in a gaseous mixture with laser radiation having an energy of 3.507 microns including the steps of:
   providing a stable frequency beam of the laser radiation;
   directing the beam of laser radiation through an enclosure which is filled with the gaseous mixture;
   applying a direct current magnetic field to the nitric oxide to tune its absorptivity to the wavelength of the laser radiation by the Zeeman effect;
   determining the intensity variation of the laser radiation which is transmitted through the enclosure; and
   comparing the intensity of the radiation transmitted through the enclosure with the intensity variation in the laser radiation passed through a calibrated sample containing a known quantity of nitric oxide.

* * * * *